US011422250B2

(12) United States Patent
Waheed et al.

(10) Patent No.: US 11,422,250 B2
(45) Date of Patent: Aug. 23, 2022

(54) METHOD AND TECHNIQUE OF POWER-EFFICIENT TWO-WAY PHASE BASED DISTANCE ESTIMATION USING PACKET SYNCHRONIZED DATA CAPTURE

(71) Applicant: NXP USA, Inc., Austin, TX (US)

(72) Inventors: Khurram Waheed, Austin, TX (US); Jose Santiago Lopez Ramirez, Tlajomulco (MX); Raja Venkatesh Tamma, Cedar Park, TX (US)

(73) Assignee: NXP USA, Inc., Austin, TX (US)

( * ) Notice: Subject to any disclaimer, the term of this patent is extended or adjusted under 35 U.S.C. 154(b) by 62 days.

(21) Appl. No.: 17/006,619

(22) Filed: Aug. 28, 2020

(65) Prior Publication Data
US 2022/0066019 A1    Mar. 3, 2022

(51) Int. Cl.
*G01S 13/84* (2006.01)
*G01S 13/82* (2006.01)

(52) U.S. Cl.
CPC ............ *G01S 13/84* (2013.01); *G01S 13/825* (2013.01)

(58) Field of Classification Search
CPC ............................... G01S 13/84; G01S 13/825
USPC ........................................ 342/125, 146, 175
See application file for complete search history.

(56) References Cited

U.S. PATENT DOCUMENTS

| 6,147,638 A | 11/2000 | Rohling et al. |
| 7,714,773 B2 | 5/2010 | Ozaki et al. |
| 8,711,038 B2 | 4/2014 | Reede et al. |
| 9,929,882 B1 | 3/2018 | Zhang et al. |
| 2002/0094786 A1 | 7/2002 | Berliner et al. |
| 2016/0178744 A1 | 6/2016 | Kluge et al. |
| 2019/0391252 A1* | 12/2019 | Waheed ................ G01S 5/0205 |
| 2020/0118372 A1 | 4/2020 | Stitt et al. |

FOREIGN PATENT DOCUMENTS

| CN | 107367723 A | 11/2017 |
| EP | 1537439 B1 | 10/2007 |
| EP | 1863190 B1 | 11/2016 |

OTHER PUBLICATIONS

Mathias Pelka et al., Accurate Radio Distance Estimation by Phase Measurements with Multiple Frequencies, IEEE 2014 International Conference on Indoor Positioning and Indoor Navigation, Oct. 27-30, 2014.

(Continued)

*Primary Examiner* — Bo Fan

(57) ABSTRACT

A wireless ranging system (700) estimates a distance (703) between wireless devices (701, 702) by calibrating the devices through exchanging calibration packets (512, 524) to adjust transceiver settings for performing phase measurements at the wireless devices, and then transmitting a measurement packet (704) from a first wireless device to a second wireless device to synchronize the first and second wireless devices and to perform a two-way IQ data capture sequence at different carrier frequencies during processing of the measurement packet so that the first and second wireless devices each measure phase values for each of the plurality of different carrier frequencies, where the phase values at each of the first and second wireless devices are processed to generate a combined phase offset vector which is processed to determine a first estimated distance between the first and second wireless devices.

20 Claims, 8 Drawing Sheets

(56) References Cited

OTHER PUBLICATIONS

Yannic Schroder et al., Accurate and Precise Distance Estimation from Phase-based Ranging Data, Institute of Operating Systems and Computer Networks, IPIN 2018, Nantes, France.

Georg Von Zengen et al., No-Cost Distance Estimation Using Standard WSN Radios, Institute of Operating Systems and Computer Networks, originally published in The 35th Annual IEEE Conference on Computer Communications INFOCOM 2016), Aug. 30, 2016.

* cited by examiner

METHOD AND TECHNIQUE OF POWER-EFFICIENT TWO-WAY PHASE BASED DISTANCE ESTIMATION USING PACKET SYNCHRONIZED DATA CAPTURE

BACKGROUND OF THE INVENTION

Field of the Invention

The present invention is directed in general to the field of wireless communications. In one aspect, the present invention relates to wireless ranging and localization systems and methods for estimating distances between and positions of wireless network devices.

Description of the Related Art

Low-power ISM band wireless standards, such as Bluetooth Low Energy (BLE) and various technologies based on IEEE 802.15.4, have broad ubiquitous adoption in industrial and consumer products, such as smartphones, tablets, smartwatches, headsets, edge nodes in Internet of Things (IoT) networks, and smart home appliances and devices, such as lighting, thermostats, etc. Increasingly adopted in industrial, medical and automotive market application domains, BLE technology provides a technology for applications that go beyond data transfer between devices since the radios included in these products are capable of advanced applications, such as distance estimation, angle (of arrival/departure) computations, and localization applications that may span the joint estimation of both the angle and the distance, when used with specialized hardware antenna arrangements. For example, Phase-based Distance Estimation (PDE) is a technique developed in the defense and satellite domain for estimating the distance between objects by measuring the phase shift or difference ($\Delta\varphi$) between a measuring device (MD), which is the initiator and determines the need to estimate distance, and an active reflector device (RD) to determine the distance between them. To support wireless ranging between two devices, a system employs a radio at each device, with one device communicating an initial packet to the other device, and with the other device responding with a return packet. Based on the difference between the phase of the received signal and the phase of the transmitted signal, the transmitting or measuring device can calculate a distance (range) between the two devices. The determined distance can be employed for a variety of functions, such as taking a specified action (e.g., granting secure access to a location or device, such as a car) when the distance is below a threshold.

Conventional wireless ranging systems have their benefits but suffer from several limitations. For example, to support sufficient resolution of the determined distance, some conventional wireless ranging systems employ wideband technologies, such as ultra-wideband (UWB) or Wireless LAN (WLAN) radios to communicate the test and return packets. However, such wideband radios consume a relatively large amount of power and are therefore not suitable for many applications, such as devices that use battery power. Furthermore, wideband radios typically have a limited range. Other conventional wireless ranging systems achieve higher distance resolution by employing a large number of radios, antennas, or wireless nodes. Conventional wireless ranging systems therefore consume a relatively high amount of power or are too complex or too insecure to be used in a variety of applications. And while narrowband PDE wireless ranging systems have been developed, they have design and performance problems that arise from the signaling synchronization and tight bilateral exchange requirements of such systems. For example, measurement accuracy can be impaired or may not be useful in a targeted application if the PDE signal synchronization requires too much time. A large time drift between two communicating devices could render a PDE measurement useless due to lost bilateral measurement synchronization. In addition, there could be significant signaling overhead for achieving time synchronization and phase coherence with existing PDE systems.

As seen from the foregoing, the existing wireless distance measurement solutions are extremely difficult to use at a practical level by virtue of the challenges with providing a practical, reliable and robust system for accurately measuring the distance between wireless devices that can meet the performance requirements and cost constraints that are associated with conventional wireless devices solutions.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
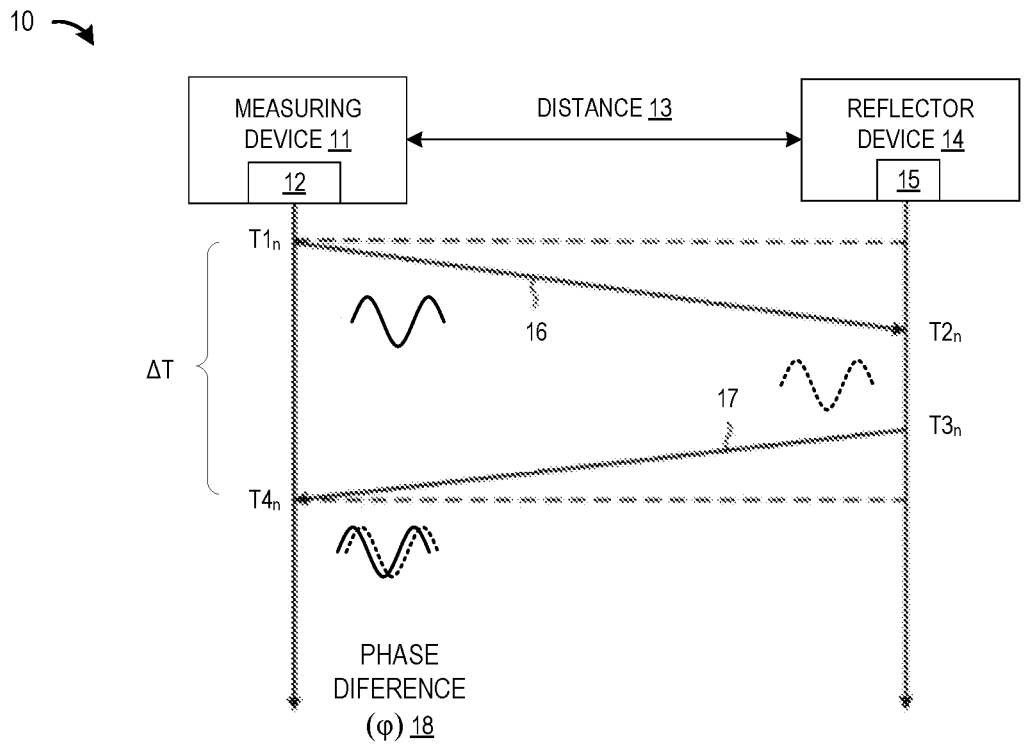
FIG. 1 is a simplified block diagram of a wireless ranging system that employs packet synchronized data capture to perform two-way phase-based distance estimation in accordance with selected embodiments of the present disclosure.

A two-way phase-based distance estimation system, circuit, and method are described for measuring distances between wireless devices by first exchanging calibration packets to calibrate the wireless devices, and then exchanging two-way data capture measurement packets which allow the wireless devices to synchronize and capture IQ samples in a power and time efficient sequence. The captured data is then processed to compute a precise distance estimate between the wireless devices. In selected embodiments, a two-way phase-based distance estimation protocol includes a measurement indication or request stage, a device calibration stage, an over-the-air (OTA) synchronization and phase measurement stage, a phase vector processing stage at each wireless device, and one or more data processing stages for computing and reporting an estimated distance between the wireless devices. During the test start stage, the measuring device sends an indication to the reflecting device that a PDE measurement is being initiated, where the indication may include the carrier frequency that will be used to synchronize the wireless devices for the calibration stage. During the calibration stage, the wireless devices exchange calibration packets (and corresponding acknowledgement messages) so that each device can determine, capture and apply optimal calibration values (AGC and DC-offset) for use in performing PDE measurements at the wireless devices. During the OTA measurement stage, the wireless devices are first synchronized by transmitting a measurement packet between the wireless devices to define an IQ data capture sequence whereby a series of carrier frequencies with a fixed frequency step size are exchanged between the wireless devices and the corresponding IQ data is captured at each wireless device during processing of the measurement packet. During the phase vector processing stage, each wireless device calculates phases values from the captured IQ data samples, thereby generating a phase vector at each device. During the data processing stages, the phase vectors from the wireless devices are combined and processed to compute the estimated distance between the wireless devices using any suitable PDE algorithm to calculate a precise distance estimate and a distance estimation quality metric (indicating a measurement quality confidence level).

Various illustrative embodiments will now be described in detail with reference to the accompanying figures. As described hereinbelow, the disclosed embodiments can be arranged and designed in a wide variety of different configurations. Thus, the following detailed description of various embodiments, as represented in the figures, is not intended to limit the scope of the present disclosure, but is merely representative of various embodiments. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. In addition, the various aspects of the embodiments are presented in drawings that are not necessarily drawn to scale unless specifically indicated. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. For example, selected aspects are depicted with reference to simplified circuit schematic drawings without including every circuit detail in order to avoid limiting or obscuring the present invention. Such details are well known and not considered necessary to teach one skilled in the art of how to make or use the present invention.

To provide additional details for an improved understanding of selected embodiments of the present disclosure, reference is now made to FIG. 1 which depicts a simplified block diagram of a wireless ranging system 10 that employs packet synchronized data capture to perform two-way phase-based distance estimation. As depicted, the wireless ranging system 10 includes a measuring device 11 and a reflector device 14. As described further herein, the wireless ranging system 10 is generally configured to determine a distance 13 between the devices 11 and 14 by employing a multi-stage wireless ranging protocol. Accordingly, the wireless ranging system 10 can be employed in a variety of applications and the devices 11 and 14 can be any of a variety of devices. For example, in at least one embodiment the measuring device 11 is an automobile, the reflector device 14 is a key fob, and the distance 13 identified by the wireless ranging system 10 is used to determine whether a user is in close proximity to the automobile to, for example, automatically unlock an automobile door. In another embodiment, the measuring device 11 is a sensor device located in a warehouse, the reflector device 14 is a sensor affixed to an asset to be tracked, and the distance 13 identified by the wireless ranging system 10 is used to determine whether the asset has been removed from a warehouse shelf or other storage location. Thus, the wireless ranging system 10 can be employed in any of several applications to track the distance between two devices.

To support wireless ranging, the measuring device 11 and the reflector device 14 each include a wireless radio module, designated radio module 12 and radio module 15 respectively. The radio modules 12, 15 are generally configured to transmit and receive packets according to one or more specified wireless protocols, such as Bluetooth-LE (BLE), IEEE 802.15.4, using modulation techniques (e.g., frequency-shift keying (FSK), continuous-phase FSK, Gaussian FSK, offset-QPSK, and the like) or a custom wireless protocol. In at least one embodiment, in addition to the wireless ranging functions described further herein, the radio modules 12, 15 are used to communicate other data between the devices 11 and 14 according to the corresponding wireless protocol. Such data can include, for example, device identification data, security data, multimedia data, and the like.

To implement wireless ranging, the measuring device 11 and the reflector device 14 together implement a multi-stage wireless ranging protocol including at least three stages, including a calibration stage, a data collection stage for performing OTA measurements, and one or more data processing stages. During the calibration stage, the wireless devices 11, 14 exchange calibration packets (and corresponding acknowledgement messages) so that each device can capture and apply optimal calibration values (e.g., AGC and DC-offset) for use in performing PDE measurements at the wireless devices.

Once calibrated, the wireless devices 11, 14 enter a data collection stage where the measuring device 11 employs the wireless radio module 12 to transmit a specified measurement packet to the reflector device 14 which is received at the wireless radio module 15 of the reflector device 14. During the data collection stage, the measuring device 11 and reflector device 14 are synchronized to perform OTA measurements by using the specified measurement packet to define an IQ data capture sequence by exchanging a fixed series of carrier frequencies with a fixed frequency step size between the devices 11, 14 so that corresponding IQ data is captured at each wireless device during processing of the measurement packet. As illustrated in FIG. 1, the series of frequencies may include a first continuous wave (CW) signal 16 at a first frequency (f1) that is transmitted by the measuring device 11 at time T1 and that is received and captured as IQ data samples at the reflector device 14 at time T2, and may also include a second CW signal 17 at the first frequency (f1) that is transmitted by the reflector device 14 at time T3 and that is received and captured as IQ data samples at the measuring device 11 at time T4, where the time measurement difference $\Delta T=T4-T1$ is a specified value. Using the series of carrier frequencies, additional CW signals are exchanged by the devices 11, 14 at n specified frequency offsets from the first frequency (e.g., $f1+n \times f_{OFFSET}$) and captured as corresponding IQ data samples, where the time measurement difference $\Delta T$ is constant for each additional CW signal transmitted by the measuring device 11 at time T1n and received at the reflector device 14 at time T4n.

Figure 2:
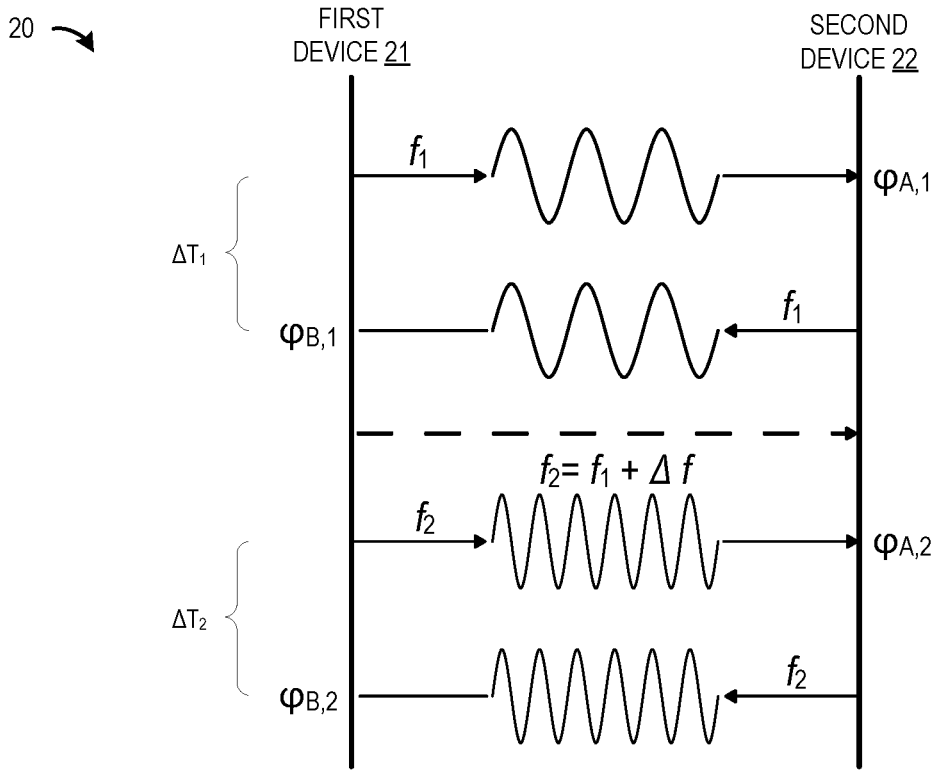
FIG. 2 diagrammatically depicts how distance estimation can be performed by detecting phase offsets from a plurality of ranging signals having different frequencies that are exchanged at synchronized measurement times.

Upon completing the OTA measurements, the measuring device 11 and reflector device 14 enter the data processing stage(s) to calculate phases values from the captured IQ data samples and generate a phase vector at each device 11, 14 corresponding to the captured IQ data samples. During the data processing stages, the phase vectors from the wireless devices 11, 14 are combined and processed to compute the estimated distance between the wireless devices using any suitable PDE algorithm to calculate a precise distance estimate and possibly a distance estimation quality metric (indicating a measurement quality level). To combine the phase vectors, the reflector device 14 may employ the wireless radio module 15 to transmit a phase vector to the measuring device 11 on a predetermined (e.g., scheduled) or requested basis (e.g., in response to a phase vector request from the measuring device 11). At the measuring device 11, the phase of each transmitted CW signal 16 at a given frequency is compared with the phase of the corresponding received CW signal 17 at the given frequency to obtain a phase difference ($\varphi$) 18 which can used to measure the distance 13 using the formula, $d=(c/2f) \cdot ((\varphi/2 \pi)+n)$, where c is the speed of light, f is the carrier frequency, and n is the number of wraps. As will be appreciated, the number of wraps "n" depends on the wavelength of the carrier frequency, $\lambda=2f/c$. If the distance to measure is larger than $\lambda$, then the phase will wrap to create a distance ambiguity, so the number of wraps n has to be accounted for. As will be appreciated, the number of phase wraps cannot be estimated using PDE alone, so other techniques (e.g., time of flight estimation) can be used, though with significant limitations. Generally, phase-based estimation is useful when no wraps occur As disclosed herein, a sweep of multiple frequencies can be used to reduce the above-mentioned ambiguity and to aid in analyzing multipath scenarios. To illustrate this scenario, reference is now made to FIG. 2 which diagrammatically depicts a wireless ranging system 20 having wireless devices 21, 22 which estimate a distance by detecting phase offsets from a plurality of ranging signals having different frequencies that are exchanged at synchronized measurement times. In the wireless ranging system 20, a first wireless device 21 may be a measuring device which initiates the phase measurement sequence with the second wireless device 22 which may be a reflector device. After initial communication between devices 21, 22 for synchronizing measurement times, the measurement process begins when the first device 21 transmits a CW signal with a first carrier frequency $f_1$ and the second device 22 measures the received signal phase at time $t_{A,1}$ as $\varphi_{A,1}$. In response, the second device 22 transmits a CW signal with the first carrier frequency $f_1$ and the first device 21 measures the received signal phase at time $t_{B,1}$ as $\varphi_{B,1}$. Subsequently, the steps may be repeated with different carrier frequencies $f_1+n \cdot \Delta f$, n=1, 2, 3, ... at times $t_{A,2}$, $t_{B,2}$, $t_{A,3}$, $t_{B,3}$, $t_{A,4}$, $t_{B,4}$, ... and the corresponding phase measurements $\varphi_{A,2}$, $\varphi_{B,2}$, $\varphi_{A,3}$, $\varphi_{B,3}$, $\varphi_{A,4}$, $\varphi_{B,4}$, ... are obtained. By specifying that $\Delta Tn=t_{B,n}-t_{A,n}$ is constant for all n, a distance estimate can then be calculated using the formula, $d=(c/4 \pi) \cdot (((\varphi_{B,2}-\varphi_{B,1})+(\varphi_{A,2}-\varphi_{A,1}))/(f2-f1))$. Of course, more distance estimates can be obtained using additional phase measurements.

Figure 3:
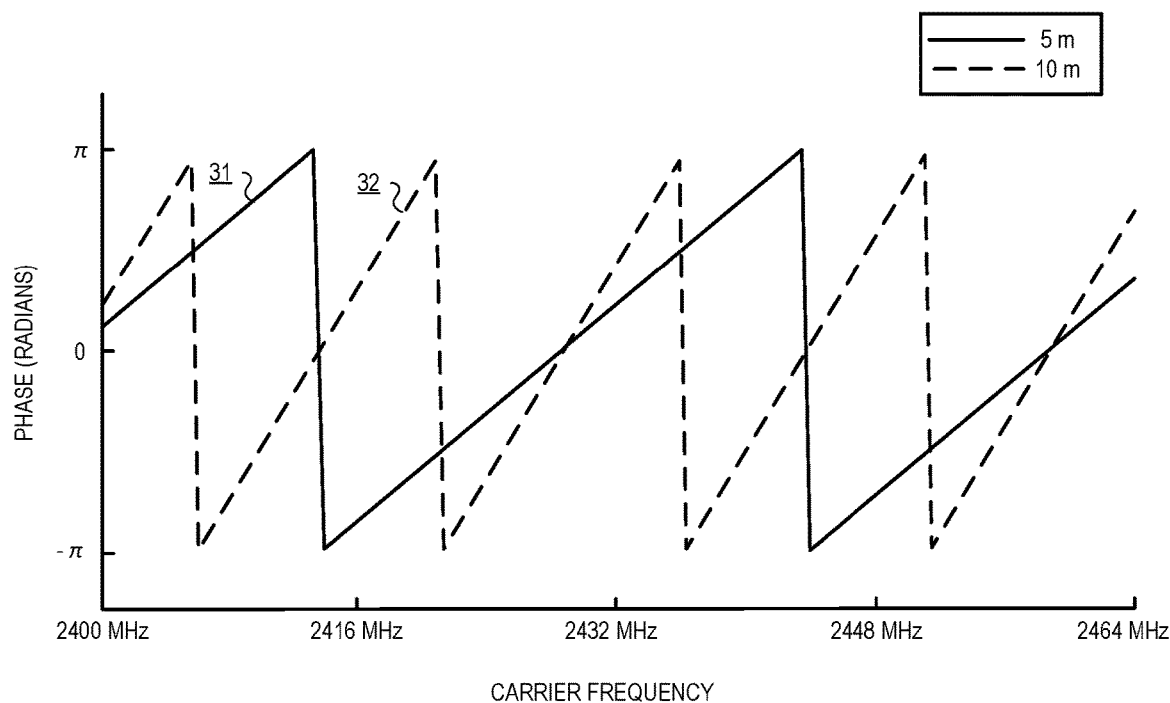
FIG. 3 depicts phase change measurements as a function of carrier frequency for frequency sweeps performed at two different distances with a fixed/constant spacing between the carrier frequencies used for making measurements.

For an improved contextual understanding of the present disclosure, reference is now made to FIG. 3 which depicts phase slope measurements 30 as a function of carrier frequency for frequency sweeps performed at two different measurement distances with constant spacing between consecutive carrier frequencies. As depicted, the first phase-to-frequency waveform 31 having a first slope is produced by performing a frequency sweep at a first fixed distance (5 m) and with constant spacing between the frequencies ($\Delta f$). In addition, a second phase-to-frequency waveform 32 is depicted which has a second, steeper slope that is produced by performing the frequency sweep at a second fixed distance (10 m) and with constant spacing between the frequencies ($\Delta f$). As shown in the waveforms 31, 32, there is a linear relationship between the phase slope observed and the distance to the object. The smaller the slope, the shorter the distance between the measuring and reflector devices.

Using the slope for each waveform 31, 32, the equivalent distance can be computed as $d=(c/4 \pi) \cdot (\text{slope})$. And by using phase differences between consecutive carrier frequencies, multiple slope-based distance estimates may be computed as:

$$d_k=(c/4\pi) \cdot ((\varphi_{k+1}-\varphi_k)/(f_{k+1}-f_k)).$$

The final distance estimate can be obtained as:

$$d_{slope}=1/(n-1) \cdot \Sigma_{k=1}^{n-1} d_k.$$

In addition, the maximum distance measurable using the slope-based method, which depends on the spacing between measurement frequencies ($\Delta f$), is given by the following equation:

$$d_{max}=c/4\Delta f.$$

Figure 4:
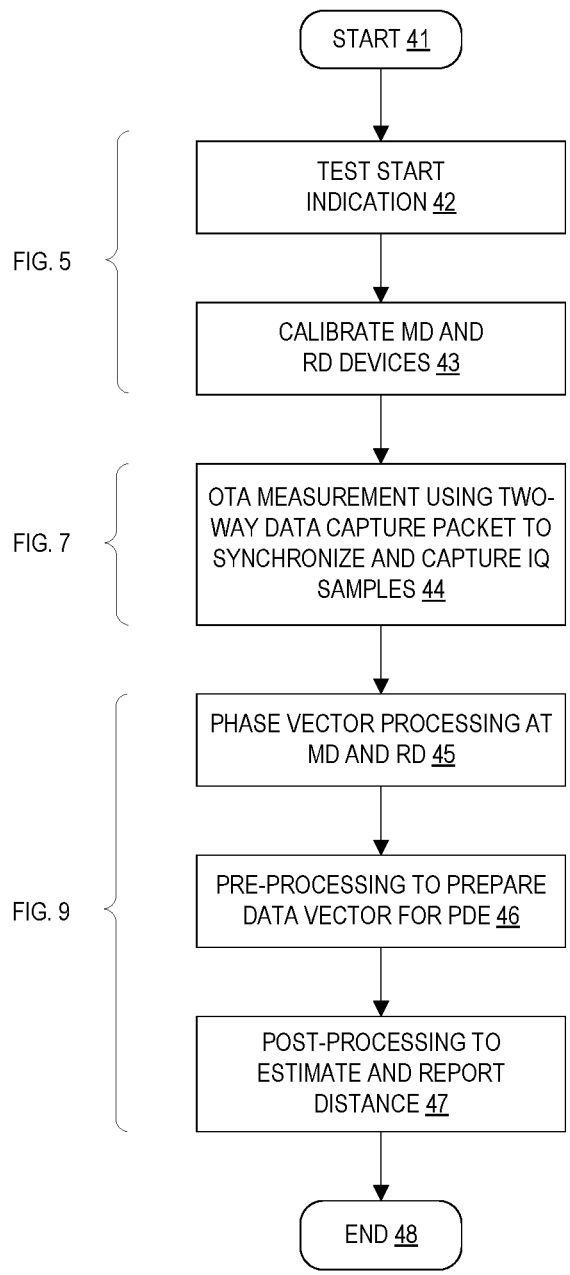
FIG. 4 illustrates a simplified flow chart showing a multi-stage process for implementing a two-way phase-based distance estimation using synchronized packet exchange in accordance with selected embodiments of the present disclosure.

For an improved understanding of selected embodiments of the present disclosure, reference is now made to FIG. 4 which illustrates a simplified flow chart of a multi-stage process 40 for implementing a two-way phase-based distance estimation technique using packet synchronized data. Once the depicted process starts (step 41), the two-way phase-based distance estimation protocol proceeds through a test start stage 42, a device calibration stage 43, an overthe-air (OTA) measurement stage 44, a phase vector processing stage 45, a data pre-processing stage 46 which prepares the phase vectors for processing, and a final post-processing stage 47 for computing and reporting an estimated distance between the wireless devices, at which point the process ends (step 48).

Though additional details are provided hereinbelow with reference to FIGS. 5-9, a generalized overview of the multi-stage process 40 shown in FIG. 4 starts with the test start stage 42 where an initiating wireless device (which may be, but is not necessarily, the measuring device) sends an indication that a PDE measurement is being initiated. During the calibration stage 43, the wireless devices exchange calibration packets, alone or in combination with corresponding acknowledgement messages, so that each device can capture and apply optimal calibration values (such as automatic gain control and/or DC settings) for use in performing PDE measurements in the subsequent OTA measurement stage. During the OTA measurement stage 44, the wireless devices are synchronized by a transmitted measurement packet which defines an IQ data capture sequence whereby a series of frequencies is exchanged between the wireless devices so that the corresponding IQ data is captured at each wireless device during processing of the measurement packet. During the phase vector processing stage 45, each wireless device operates in parallel to calculate phases values from the captured IQ data samples, thereby generating a phase vector at each wireless device. During the data pre-processing stage 46, the phase vectors from the wireless devices are combined and processed with one or more pre-processing steps to address data irregularities or outliers, remove phase wraps, apply phase rotations, or other processing to prepare the phase vector for PDE calculations. During the final post-processing stage 47, the estimated distance between the wireless devices is computed at whichever wireless device has access to the combined phase vector using any suitable PDE algorithm.

By employing the multi-stage process disclosed herein, the wireless ranging system supports several improvements in the distance estimation, including improved resolution and precision for narrow-band wireless ranging, faster measurement times, improved processing efficiency, reduced power consumption, and improved security. For example and as detailed below, the test start and calibration stages 42, 43 may be performed by exchanging available link-layer calibration packets (e.g., BLE, IEEE 802.15.4 or Generic-LL) for initiation and time synchronization of measurement between wireless devices as well as tuning of transceiver operational parameters, such as automatic gain control (AGC) and other transceiver calibrations, such as DC calibration, IQ mismatch, etc. In addition, the OTA measurement stage 44 achieves precise synchronization between wireless devices and performs active measurements in a short period of time by using a standard packet structure (e.g., BLE) to derive specific anchor points for the transmitting and receiving wireless devices to synchronize measurement timers and data capture streams. In this way, the OTA measurement stage 44 can control the phase locked loop in both wireless devices to allow for each device to be able to switch RX/TX roles at a carrier frequency while maintaining frequency lock and PLL phase relationship with the reference clock, thereby achieving higher resolution and precision of wireless ranging computations. And by performing bilateral measurement between two wireless devices using the measurement packet, power consumption is reduced by reducing the time it takes to collect data samples on multiple-frequencies. There are additional power consumption benefits that arise from using 2.4 GHz ISM band or medical body area network frequency band which make the wireless ranging protocol suitable for battery powered applications. The compact phase measurement with the measurement packet also increases the accuracy of distance estimation computations with moving wireless devices by reducing the amount of time required to collect the phase data, thereby minimizing the effects of time and frequency drift between wireless devices. The short phase measurement and IQ capture times also reduce the effects of carrier frequency offsets between wireless devices, as well as minimize the effects of ambient and radiation parameters. Finally, the vector and data processing stages 45-47 may employ vector processing hardware to efficiently assemble, combine, and process the phase vectors to compute a high quality phase-based distance estimation of the distance between the wireless devices. While PDE algorithms can be computationally heavy, the high quality phase measurements enable low computational complexity implementations of PDE algorithms that are suitable for embedded systems.

Figure 5:
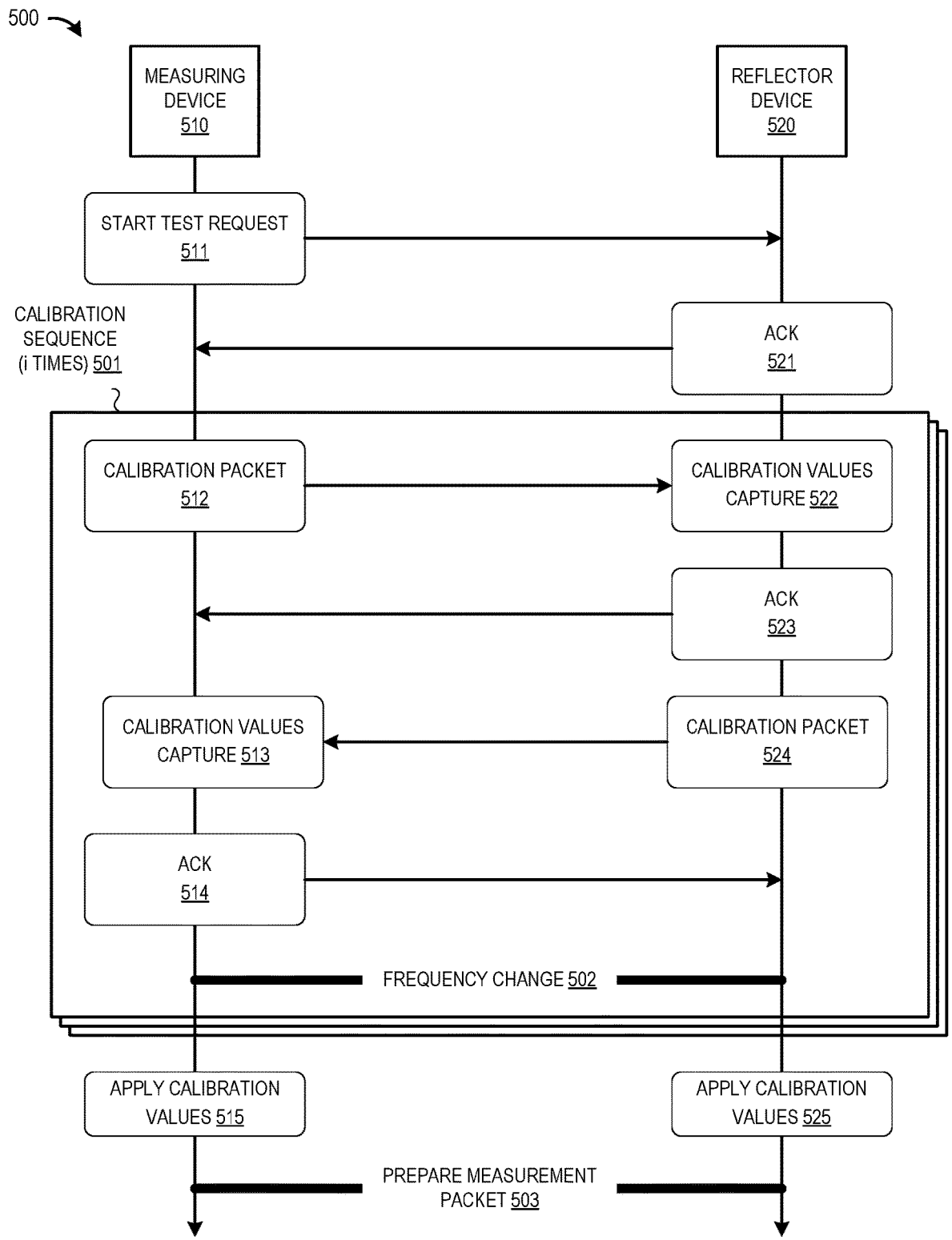
FIG. 5 is a simplified block diagram of a wireless ranging system which performs a test start and calibration sequence as part of the two-way phase-based distance estimation protocol in accordance with selected embodiments of the present disclosure.
Figure 6:
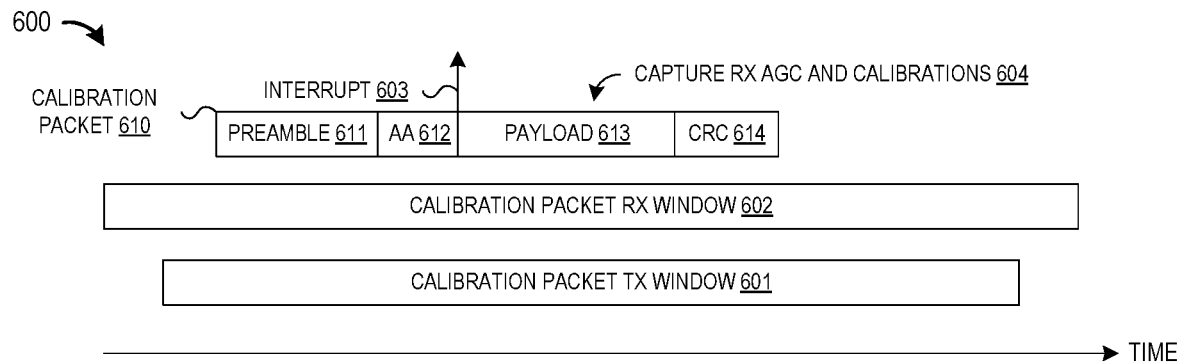
FIG. 6 illustrates the processing of a calibration packet in accordance with selected embodiments of the present disclosure.

While any suitable test start indication sequence may be used, reference is now made to FIG. 5 which depicts a simplified block diagram of a wireless ranging system 500 which performs a test start indication sequence to begin the two-way phase-based distance estimation protocol in accordance with selected embodiments of the present disclosure. As depicted, the wireless ranging system 500 includes a measuring device 510 and a reflector device 520. As will be appreciated, the wireless ranging system 500, like the wireless ranging system 10 depicted in FIG. 1, is generally configured to determine a distance between the devices 510 and 520 by employing a multi-stage wireless ranging protocol.

To initiate the calibration and measurement process, the measuring device 510 and reflector device 520 each freeze or lock their respective phase lock loop (PLL) devices to prevent changes so that the PLLs remain coherent through the calibration and capture processes. In addition, the measuring device 510 initiates the distance measurement process by transmitting start test request 511 to the reflector device 520. As will be appreciated, the start test request 511 may take any suitable form, including but not limited to a time sync packet or a High Accuracy Distance Measurement (HADM) request specified in the Bluetooth applications or any other transmission packet from the measuring device 510 to indicate to the RD 520 that a PDE measurement is about to start. In addition, the start test request 511 may include information required to synchronize the timing and frequency offset pattern to be used during the subsequent OTA measurement stage. Such information may include predetermined measurement parameters, such as an initial frequency f1 and a specified frequency offset value $f_{OFFSET}$ that is used to construct a sequence of n frequency values, $fn = f1 + nf_{OFFSET}$). By transmitting the start test request 511, both devices 510, 520 are synchronized for the PDE measurement and for the calibration stage.

In response to receiving the start test request 511, the reflector device 520 may transmit an acknowledgement message (ACK) 521 to the measuring device 510. As will be appreciated, the acknowledgement 521 may take any suitable form to acknowledge that the RD 520 is ready for the PDE measurement. In selected embodiments, the MD 510 may be configured to automatically re-transmit the start test request 511 if an acknowledge message (ACK) 521 is not received within a specified response period.

After the initial test start messages 511, 512 for synchronizing measurement times between the devices 510, 520, the wireless devices 510, 520 begin a device calibration process which is applied to address any impairments in the signals (e.g., that arise from small offsets between the transmitted and reference carrier frequencies) or impairments in the channel (e.g., that is caused by interference that may randomly affect the measurements taken at certain clusters of carrier frequencies). While any suitable calibration process may be used, FIG. 5 depicts an example calibration sequence 501 which may be repeated a plurality of i times to evaluate different channel conditions. For example, with i=3, a first calibration sequence may be used to compute calibration values at a first minimum frequency value, a second calibration sequence may be used to compute calibration values at a second maximum frequency value, and a third calibration sequence may be used to compute calibration values at a third middle frequency value.

Each calibration sequence 501 may start when the measuring device 510 transmits a calibration packet 512 to the reflector device 520 at a specified frequency value. At the reflector device 520, the received calibration packet 512 is processed to capture the RD's calibration values 522 corresponding to transceiver impairments that can impact phase capture information, such as receiver gain settings, DC offsets, receiver impairment compensations, IQ mismatch, filtering transfer function contributions, PLL phase excursions, and so on. After successfully receiving and processing the calibration packet 512, the reflector device 520 may transmit an acknowledge message (ACK) 523 to the measuring device 510 in any suitable form to acknowledge that the RD 520 received the calibration packet 512. At the measuring device 510, the acknowledgement 523 may be used to confirm or adjust a transmit calibration setting, such as transmit power or the like. In selected embodiments, the MD 510 may be configured to automatically re-transmit the calibration packet 512 if an acknowledgement message (ACK) 523 is not received within a specified response period.

The calibration sequence 501 then reverses the roles of the measuring device 510 and reflector device 520 to capture additional calibration values. In particular, the reflector device 520 transmits a calibration packet 524 to the measuring device 510 at the specified frequency value. In turn, the measuring device 510 processes the received calibration packet 524 to capture the MD's calibration values 513 corresponding to transceiver impairments that can impact phase capture information. After successfully receiving and processing the calibration packet 524, the measuring device 510 may transmit an acknowledgement message (ACK) 514 to the reflector device 520 to acknowledge that the MD 510 received the calibration packet 524.

As disclosed herein, any suitable packet structure may be used for the calibration packets (e.g., 512) that are used to capture calibration values. For example, reference is now made to FIG. 6 which provides a diagrammatic illustration 600 of the processing of a calibration packet 610 in accordance with selected embodiments of the present disclosure. As depicted, the calibration packet 610 may employ a Generic Frequency Shift Keying (GenFSK) packet structure which includes a preamble portion 611, an access address (AA) portion 612, a payload portion 613, and a CRC portion 614. As will be understood, the preamble portion 611 includes a predetermined sequence of 0's and 1's that are used to make a receiver aware that a packet is about to be received. The AA portion 612 is the packet identifier which allows the receiver to determine if the calibration packet is intended for it or not (in which case it is ignored). The payload portion 613 is the data content of the packet that is to be transmitted and that is evaluated at the receiver to capture one or more calibration values. The CRC portion 614 may include error correction data, such as a checksum for verifying there are no errors during the packet reception.

In order to capture calibration values, the calibration packet 610 is transmitted during a calibration packet transmission window 601 specified at a first wireless device (e.g., the measuring device) when the second wireless device (e.g., the reflector device) is also configured to receive a packet in a calibration packet reception window 602. When the transmitter sends the calibration packet 610 during the defined transmit window 601, the receiver is configured to receive and process the calibration packet 610 by processing the preamble portion 611 to detect the existence of the packet 610, and by processing the AA portion 612 to detect that the packet 610 addressed to the receiver. At this point, the receiver issues an interrupt 603 or other processing command to instruct the receiver to process at least the payload portion 613 to capture the calibration values 604, such as the receiver AGC and calibrations.

If an additional calibration sequence 501 is to be performed at a new frequency, the measuring device 510 and reflector device 520 both change or adjust the frequency (step 502) before repeating the bilateral sequence of transmitting calibration packets 512, 524 and capturing calibration values 522, 513 at the new frequency. In more complex environments, the calibration sequence 501 can be expanded to scan the channel for (multiple access and multi-path) interference and choosing the block of frequencies that are to be used for PDE measurement.

After the calibration sequence 501, the measuring device 510 and the reflector device 520 each applies its respective calibration values 515, 525 in order to minimize the transceiver impairments that can impact the phase capture information. In the calibration value application processes 515, 525, the optimal transceiver settings are chosen for receive and transmit operations by the MD 510 and RD 520, such as receiver gain settings, DC settings, receiver impairment compensations, transmit power, etc. based on synchronization on successfully transmitted (or received) calibration packets 512, 524. In addition, since signal saturation or fading can affect the accuracy of phase calculations, the applied calibration values may also ensure a good dynamic range for the captured IQ samples. In order to ensure accurate PDE calculations, the applied calibration values should also control the PLLs in both the the MD 510 and RD 520 so that they remain frequency-coherent throughout the subsequent IQ capture process. The applied calibration values should also synchronize the transmit and receive cycles of the MD 510 and RD 520 in cases where the PDE algorithms require changing the tone frequencies with a specific time interval. Generally speaking, the calibration value application processes 515, 525 reduce or eliminate the transceiver impairments that can impact IQ sample quality so that captured phase fidelity is maximized to allow high quality phase (& magnitude) information to be derived from the captured IQ samples.

After completing the initialization and calibration stages, the measuring device 510 and the reflector device 520 have achieved good timing and frequency synchronization, along with an optimized carrier frequency offset (if needed). In addition, the calibration process specifies optimal transceiver operational parameter settings (e.g., AGC, DC offsets, IQ mismatch, etc.) for the MD 510 and RD 520 over the targeted measurement frequency range.

Once calibrated, the wireless devices 510, 520 prepare a measurement packet (step 503) that is used for two-way synchronization and capture of IQ data samples. In selected embodiments, the measurement packet may include a preamble, an access address, and a payload (like a BLE packet), and may be used to synchronize the timings between two (or more) wireless devices for the IQ data capture sequence which perform over-the-air measurements of phase offsets.

Once generated, the measurement packet is transmitted between the wireless devices to define a two-way data capture process whereby the measuring device and reflector device generate Continuous-Wave (CW) tones and capture IQ samples at a plurality of measurement frequencies. To this end, the measurement packet transmitted between wireless devices is processed by both devices to specify a first time interval when a first wireless device (e.g., the measuring device) generates and transmits a tone at a first frequency $f_1$. At the same time interval, the second peer wireless device (e.g., the reflector device) sets its radio to the RX mode at the first frequency $f_1$ and starts to capture IQ samples. Upon expiration of the first time interval, the wireless devices change roles so that the second wireless device generates and transmits a tone at the first frequency $f_1$ during a second specified time interval, and the first wireless device starts the RX and IQ capture at the first frequency $f_1$ during the second specified time interval. After the first tone exchange sequence for the first frequency $f_1$, both wireless devices return to their original roles, and the frequency is updated to a second, new frequency $f_2$, such as by using a specified frequency offset $\Delta f$ or by following an predetermined frequency adjustment pattern. For this new tone exchange, the first wireless device generates and transmits a second tone at a second frequency $f_2$ during a third specified time interval when the second wireless device simultaneously sets its radio to the RX mode at the second frequency $f_2$ to capture IQ samples. Upon expiration of the third time interval, the wireless devices change roles so that the second wireless device generates and transmits a tone at the second frequency $f_2$ during a fourth specified time interval when the first wireless device starts the RX and IQ capture at the second frequency $f_2$. The tone exchange sequence is repeated for all frequency values fn using additional specified time intervals that are defined for each measurement.

Figure 7:
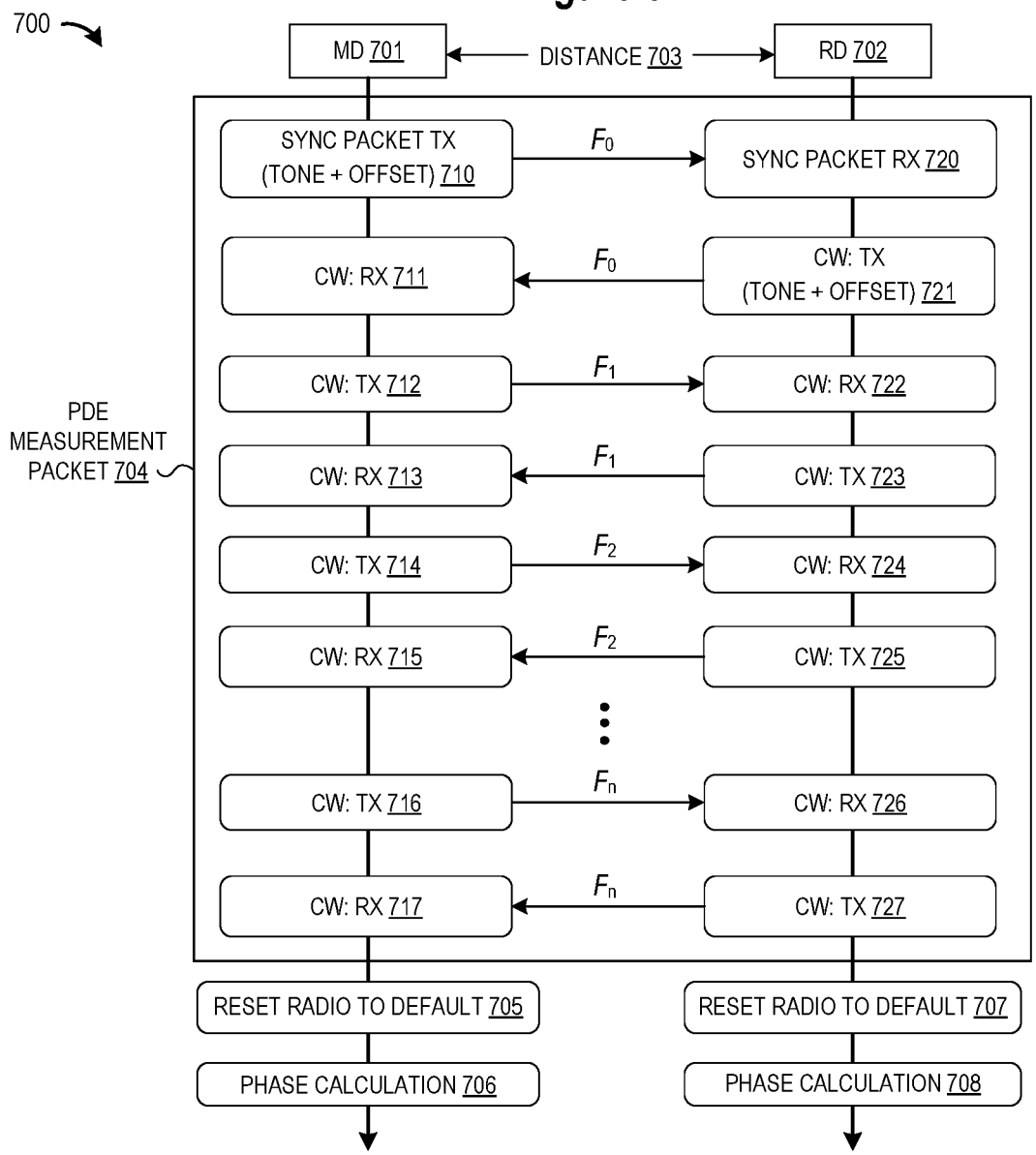
FIG. 7 is a simplified block diagram of a wireless ranging system which performs an over-the-air measurement of phase offsets using synchronized 2-way packet exchange as part of the phase-based estimation protocol in accordance with selected embodiments of the present disclosure.

For an improved understanding of selected embodiments of the present disclosure, reference is now made to FIG. 7 which depicts a simplified block diagram of a wireless ranging system 700 which performs an over-the-air measurement of phase offsets under control of a two-way data capture measurement packet. As depicted, the wireless ranging system 700 includes a measuring device 701 and a reflector device 702 which are each configured to estimate a distance 703 between the devices 701, 702 by employing a PDE measurement packet 704 which is transmitted from the measuring device 701 to the reflector device 702 (or vice versa). The transmitted PDE measurement packet 704 may be a well-formed packet, such as a BLE packet, which includes a preamble, access address and payload. Under control of the PDE measurement packet 704, the devices 701, 702 each synchronize with one another and derive specific anchor points from the TX and RX PHY implementations that enable precise phase measurements at the respective devices 701, 702 by executing a predetermined sequence of IQ data capture steps for use in calculating the phases of exchanged frequency signals.

As an initial step, the MD 701 sends the PDE measurement packet 704 by transmitting a transmit synchronization packet portion 710 (e.g., the preamble and access address) which the MD 701 uses to start a TX timer based on an anchor event (e.g., the digital transmit enable signal), where the timer has a specified timeout value equal to the packet's time of flight+differential latency between measuring device processing+data capture guard time. At the RD 702, the sync packet 710 is received and processed at step 720, and upon detecting a matching access address, the RD 702 triggers an RX timer with a timeout value equal to a fixed data capture guard time. As disclosed herein, the guard times in the timeout values are selected to allow sufficient time for both wireless devices 701, 702 to prepare and configure for the forthcoming data capture steps. With the transmission of the synchronization packet portion 710, the data capture begins during processing of the data payload portion of the PDE measurement packet 704 when the MD 701 sends a CW signal at an initial tone or frequency $F_0$, alone or in combination with an offset tone. At step 720, the RD 702 captures the IQ samples of that CW signal at the initial frequency $F_0$. The transmission of the CW signal by the MD 701 and capture of IQ samples by the RD 702 at this initial frequency $F_0$ continues until the guard intervals from the TX and RX timers expire at a timer sync point.

At the expiration of the guard intervals, both the wireless devices 701, 702 are assumed synchronized for measurement, and the IQ data capture processing continues by switching the transmission and reception roles of the wireless devices 701, 702 (i.e., RD 702 switches from a receive to transmit mode, and MD 701 switches from a transmit to receive mode). With the roles switched, the RD 702 sends a CW signal at the initial frequency $F_0$, alone or in combination with the offset tone, at step 721, and the MD 701 captures the IQ of that signal at the initial frequency $F_0$ at step 711. The transmission of the CW signal by the RD 702 and capture of IQ samples by the MD 701 at the initial frequency $F_0$ continues until a defined timer interval expires at the MD 701 and RD 702.

To capture additional IQ samples at a different frequency, the wireless devices 701, 702 switch transmit and receive roles and adjust the operating carrier frequency to a new frequency $F_1$ so that the MD 701 sends a CW signal at the new frequency $F_1$ at step 712, and the RD 702 captures the IQ of that signal at the new frequency $F_1$ at step 722. The transmission of the CW signal by the MD 701 and capture of IQ samples by the RD 702 at the new frequency $F_1$ continues until a defined timer interval expires at the MD 701 and RD 702. Next, the wireless devices 701, 702 switch the transmission and reception roles, and the RD 702 sends a CW signal at the new frequency $F_1$ at step 723, and the MD 701 captures the IQ of that signal at the new frequency $F_1$ at step 713. The transmission of the CW signal by the RD 702 and capture of IQ samples by the MD 701 at the initial frequency $F_1$ continues until a defined timer interval expires at the MD 701 and RD 702.

If additional frequency measurements are needed, the wireless devices 701, 702 again switch roles and adjust the operating carrier frequency to another frequency $F_2$. In this configuration, the MD 701 sends a CW signal at the new frequency $F_2$ at step 714, and the RD 702 captures the IQ of that signal at the new frequency $F_2$ at step 724 for a defined timer interval. And after switching their transmission and reception roles, the RD 702 sends a CW signal at the new frequency $F_2$ at step 725, and the MD 701 captures the IQ of that signal at the new frequency $F_2$ at step 715 for a defined timer interval. This procedure is repeated for each additional frequency ($F_n$) as part of processing the PDE measurement packet 704 where the MD 701 transmits the CW signal at the nth frequency $F_n$ (step 716) for reception and capture by the RD 702 at the new frequency $F_n$ (step 726) for a defined timer interval, followed by the RD 702 transmitting the CW signal at the nth frequency $F_n$ (step 727) for reception and capture by the MD 701 at the new frequency $F_n$ (step 717) for a defined timer interval.

As will be appreciated, this example data capture sequence can be adjusted or modified to follow a different order or to provide additional functionality. For example, the sequence of frequencies $F_1$-$F_n$ can be constructed by using a uniform frequency offset value $\Delta f$, or by following a patterned sequence of frequencies. In addition, the one or more of the CW signal transmissions may be modified in response to instructions conveyed in the initial sync packet 710. Another option is to bilaterally perform a modulated-tone based measurement by both devices 701, 702 to make a fine DC residual measurement in the captured IQ samples. This may be implemented in the initial exchange of CW signals (e.g., 710, 721) where the initial frequency used to capture data for a CW tone can be modulated with an optional offset tone on both devices 701, 702. This modulated-tone based measurement can be used for miscellaneous purposes, including but not limited to checking the quality of IQ data capture, performing optimizations with fine digital calibration of DC offsets and/or other transceiver impairments (e.g., IQ gain and phase mismatch, etc.) or measuring time or frequency drift between the two devices making the measurement. In addition, the modulated-tone based measurement technique can be used for Carrier Frequency Offset (CFO) estimation, which could be estimated and a correction trim may be applied to (crystal reference frequency or the PLL tuning word) of one of two devices (typically RD) to correct for the relative CFO between MD and RD.

The data capture sequence controlled by the PDE measurement packet 704 can also be adjusted in other ways. For example, during the PDE measurement, the defined timer interval for the radio dwell time at each frequency can be adjusted at the devices 701, 702 on a randomized or pre-defined basis to relay sideband information or add security attributes to the measurement.

As seen from this example of a phase measurement process, the phase locked loop devices at the measuring device 701 and reflector device 702 should be controlled to allow for each device 701, 702 to be able to switch RX/TX roles at a carrier frequency, while maintaining frequency lock and PLL phase relationship with the reference clock. In this way, a precise multi-frequency tone exchange sequence can be executed between the measuring device 701 and reflector device 702 for bi-directional transmission of carrier frequencies and corresponding IQ data capture from correspondingly received baseband signals.

Upon completing the IQ data capture processing steps, the radio settings at the MD 701 may be reset to a default condition (step 705) before proceeding to calculating phase values (step 706). In addition, the radio settings at the RD 702 may be reset to a default condition (step 707) before proceeding to calculating phase values (step 708).

As depicted at steps 706, 708, each of the measuring device 701 and reflector device 702 separately calculate their own set of phase values for the different frequencies ($F_0$-$F_n$). In particular, the MD 701 implements a phase calculation step 706 to obtain the unwrapped phase values from the captured IQ samples 711, 713, 715, 717. These computed phase values may be combined to form a first phase vector at the MD 701. In similar fashion, the RD 702 implements a phase calculation step 708 to obtain the unwrapped phase values from the captured IQ samples 720, 722, 724, 726 which may be combined to form a second phase vector at the RD 702.

Figure 8:
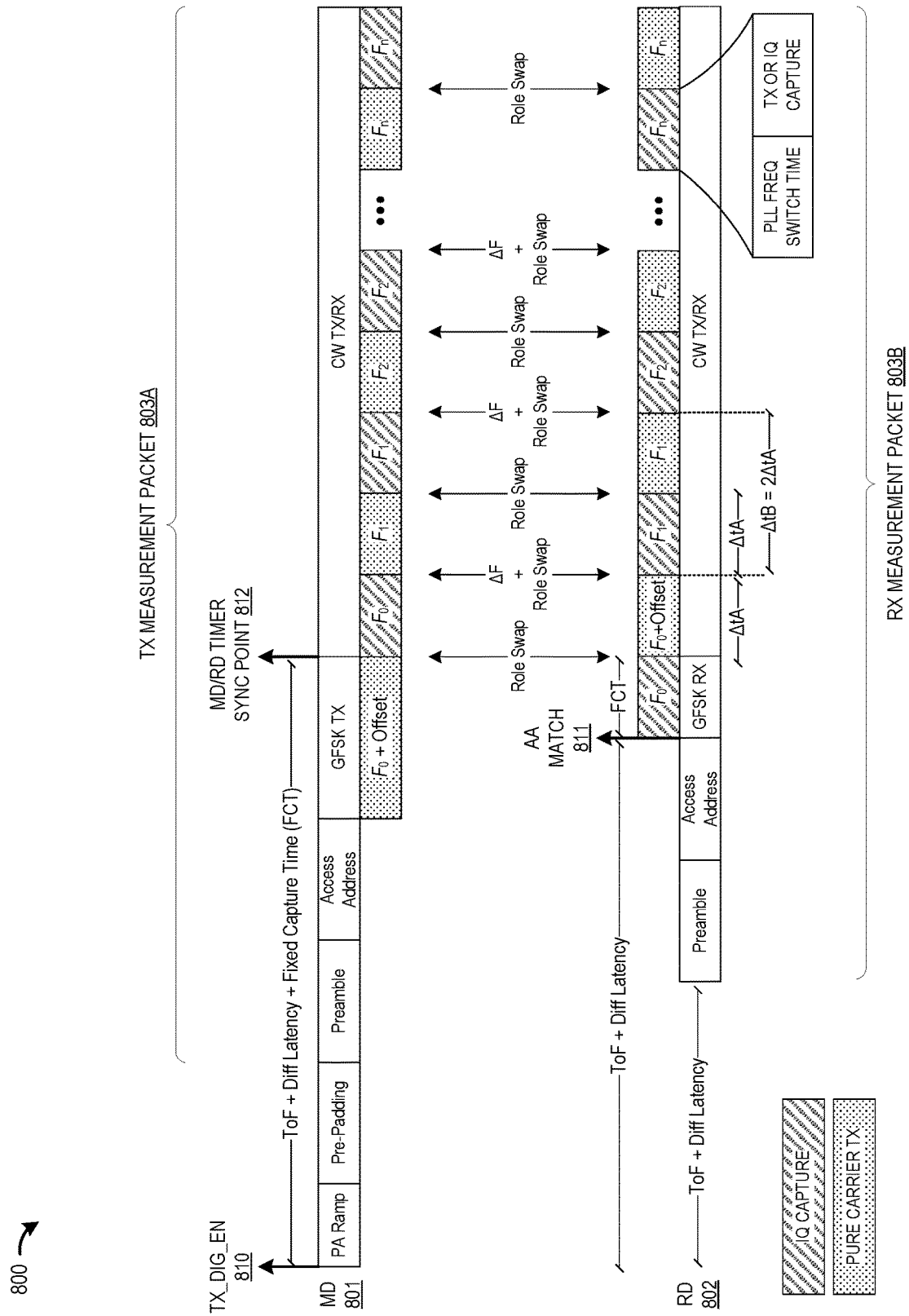
FIG. 8 diagrammatically depicts a PDE measurement packet which is transmitted and received to control the timing and frequency synchronization when performing IQ data capture in accordance with selected embodiments of the present disclosure.

While the PDE measurement packet 704 may use any suitable packet structure to provide synchronized timing for the two-way IQ data capture sequence, reference is now made to FIG. 8 which is a diagrammatically depiction 800 of a PDE measurement packet 803A/B which is transmitted by a measuring device 801 and received by a reflector device 802 to control the timing synchronization when performing IQ data capture in accordance with selected embodiments of the present disclosure. As depicted, the PDE measurement packet 803A transmitted by the MD 801 is formatted with two parts. The first part includes the preamble and access address, and the second part is the data payload which begins with the Gaussian Frequency Shift Keying (GFSK) transmit portion and includes a IQ data capture portion which uses two-way continuous wave transmit/receive processing as disclosed herein. In similar fashion, the PDE measurement packet 803B received by the RD 802 has the same formatting with a first part (the preamble and access address) and a second data payload part which begins with the Gaussian Frequency Shift Keying (GFSK) receive portion and includes a IQ data capture portion which performs two-way continuous wave transmit/receive processing.

In operation, the MD 801 begins the packet transmission process in response to a digital transmission signal 810 (TX_DIG_EN) being set by ramping up the TX power amplifier (PA Ramp) and generating a pre-padding layer (Pre-padding) before transmitting the constructed measurement packet 803A. In addition, the MD 801 triggers a transmit timer that starts at the digital transmission signal 810 and continues for a transmit timeout value to expire at a timer sync point 812 for the wireless devices 801, 802. To this end, the MD 801 computes the timeout value to equal the combination of the packet's time of flight (ToF), the differential latency between measuring device processing (Diff Latency), and a fixed capture time (FCT) that provides a guard time.

At the RD 802, the PDE measurement packet 803B is received after a short delay caused by traversing the distance between the wireless devices 801, 802. This delay equals the packet's time of flight (ToF) and the differential latency (Diff Latency). On detecting access address match 811, the RD 802 triggers a receiver timer that starts at the access address match 811 and continues for a receiver timeout value equal which expires at a timer sync point 812 for the wireless devices 801, 802. To this end, the RD 802 computes the timeout value to equal the fixed capture time (FCT).

Prior to synchronization of the MD/RD devices 801, 802, the MD 801 is configured to perform IQ capture processing at an initial frequency $F_0$ by transmitting a first CW signal at the initial frequency $F_0$ during the GFSK transmit packet portion of the transmitted PDE measurement packet 803A after the access address portion is transmitted. At the RD 802, the detection of the access address match 811 prompts the RD 802 to capture the IQ of that signal at the initial frequency $F_0$ during the GFSK receive portion of the received PDE measurement packet 803B. The IQ capture processing at the initial frequency $F_0$ by the RD 802 continues until transmit and receiver timers expire at the MD/RD timer sync point 812 for devices 801, 802. At the timer expiration/sync point 812, the devices 801, 802 are assumed synchronized for subsequent phase measurements and they switch or swap their transmit and receive roles so that, during a defined timer interval $\Delta tA$, the RD 802 sends a CW signal at the initial frequency $F_0$ to the MD 801 which captures the IQ of that signal at the initial frequency $F_0$.

As an alternative to transmitting the first CW signal at the initial frequency $F_0$, the MD/RD devices 801, 802 may bilaterally perform a modulated-tone based measurement in order to perform fine DC residual measurement in the captured IQ samples. In such embodiments, the MD 801 transmits a first modulated CW signal where the initial frequency $F_0$ is combined with a frequency offset (Offset) during the GFSK transmit packet portion of the PDE measurement packet 803A after the access address portion is transmitted. At the RD 802, the detection of the access address match 811 prompts the RD 802 to capture the IQ of that signal at the initial frequency $F_0$ during the GFSK receive portion. At the expiration of the transmit and receiver timers 812, the devices 801, 802 are assumed synchronized for subsequent phase measurements and they switch or swap their transmit and receive roles so that, during the defined timer interval $\Delta tA$, the RD 802 sends the first modulated CW signal ($F_0$+Offset) to the MD 801 which captures the IQ of that signal at the initial frequency $F_0$.

At the end of the defined timer interval $\Delta tA$, both wireless devices 801, 802 swap transmit and receive roles and change the operating carrier frequency to a second frequency $F_1$. The carrier frequency may be adjusted by adding a defined frequency offset $\Delta F$ for each IQ capture process (e.g., $F_1 = F_0 + n\ \Delta F$. Alternatively, the carrier frequency may be adjusted by following a defined frequency hopping pattern known to the MD/RD devices 801, 802. After adjusting to the second frequency $F_1$, new IQ capture processing can then begin when the MD 801 transmits a CW signal at the new frequency $F_1$ and the RD 802 captures the IQ of that signal at the second frequency $F_1$. At the end of a defined timer interval $\Delta tA$, the devices 801, 802 switch their transmit and receive roles, and the RD 802 sends a CW signal at the second frequency $F_1$ to the MD 801 which captures the IQ of that signal at the second frequency $F_1$. This procedure is repeated for all n frequencies, with the MD/RD devices 801, 802 swapping transmit and receive roles each time the defined timer interval $\Delta tA$ expires so that each frequency $F_i$ is subjected to two-way IQ capture processing during a sampling frequency duration $\Delta tB = 2\Delta tA$.

As will be appreciated by the requirement that the MD/RD devices 801, 802 must perform two-way IQ capture processing of CW signals that have changing frequencies, the defined timer interval $\Delta tA$ is controlled to provide sufficient time for the MD/RD devices 801, 802 to switch the PLL frequency to a new frequency and to transmit the CW signal at the new frequency (in the case of a transmitter device) or to capture the IQ sample data (in the case of a receiver device). While the defined timer interval $\Delta tA$ may be a fixed value, in other embodiments, the timer interval used for IQ sampling at each frequency during the PDE measurement may be adjusted, randomized or changed per a pre-defined rule to relay side information or add security attributes to the measurement.

After the IQ samples are captured, each of the MD/RD devices 801, 802 calculates the phase values from the captured IQ data and then processes the phase values to form a phase vector at each of MD/RD devices 801, 802. While any suitable phase calculation algorithm may be used, the phase difference $\varphi$ from the IQ samples may be computed as $y = \arctan 2(Q/I)$. Optionally, the phase vector processing stage may include a mechanism to filter out corrupted phase values and/or process captured IQ data to compensate for any data capture impairments. By separately processing the phase vectors, each of the MD/RD devices 801, 802 holds the phase difference slope of the peer device against its own local oscillator. To obtain the phase combination result of the distance, the phase slope from the RD 802 must be added to the phase slope from the MD 801 using the equation, $\Delta\varphi = \varphi_{MD} + \varphi_{RD}$. However, to combine the phase slopes, the phase vectors from the MD/RD devices 801, 802 must be calculated.

Figure 9:
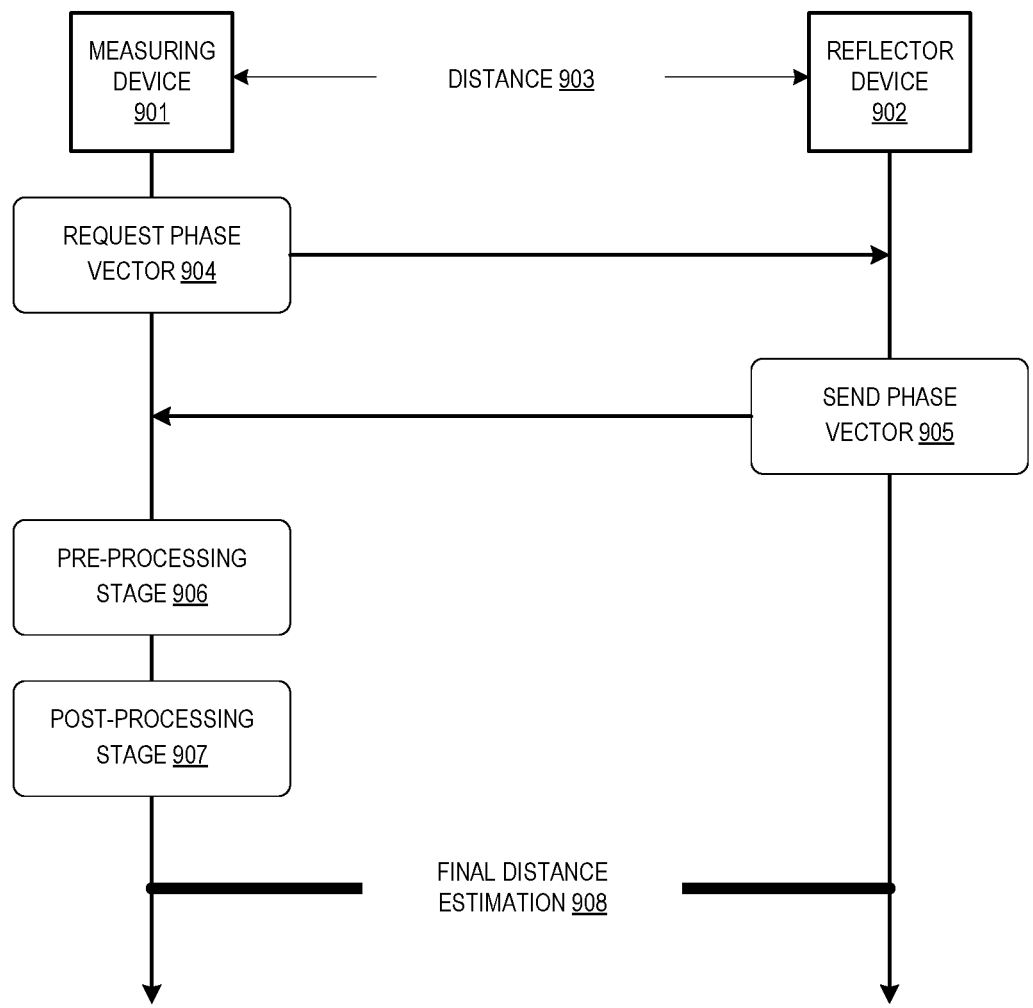
FIG. 9 is a simplified block diagram of a wireless ranging system which performs phase vector processing as part of the phase-based estimation protocol in accordance with selected embodiments of the present disclosure.

To provide additional details for an improved understanding of how the phase vectors are processed, reference is now made to FIG. 9 which depicts a simplified block diagram of a wireless ranging system 900 which performs phase vector processing as part of the two-way data capture packet. As depicted, the wireless ranging system 900 includes a measuring device 901 and a reflector device 902 which are each configured to estimate a distance 903 between the devices 901, 902 by generating and combining phase vectors to compute a phase-based estimation of the distance 903 between the devices 901, 902. To combine the phase vectors generated separately at the measuring device 901 and reflector device 902, the measuring device 901 sends a phase vector request 904 to the reflector device 902 using any suitable message request format. In response, the reflector device 902 sends back the phase vector 905 that was derived from the IQ capture data collected at the reflector device 902.

At the data pre-processing stage 906, the MD 901 performs one or more processing steps to combine and prepare the phase vector for use in the PDE algorithm. The pre-processing stage 906 may be invoked when a threshold number of IQ samples are collected during the PDE measurement stage. Examples of pre-processing steps include, but are not limited to, combining the individual phase vectors from MD 901 and RD 902 into a single combined phase vector. In addition, the combined phase vector may be processed to remove a wraps. In addition, the pre-processing stage may identify and discard or remove possible phase measurements outliers that might have been affected by interference. In addition, implementation specific adjustments to the computed phase vector may be applied, such as phase rotations, etc.

At the data post-processing stage 907, the MD 901 performs one or more post-processing steps to make use of the pre-processing output combined phase vector to obtain the distance estimate using one of the many possible distance estimation algorithms. For example, once N pairs of measurements $\{\varphi_{A,n}, \varphi_{B,n}\}$ taken at frequencies $f_n$, $n = 1, 2, 3, \ldots, N$ are available, a number of suitable distance estimation algorithms can be used, including but not limited to slope-based phase estimation techniques, spectral analysis techniques such as IFFT, complex-domain estimation (CDE) techniques, CDE methods along with interpolation, MUltiple SIgnal Classification (MUSIC) techniques, matrix-pencil techniques, and the like. Examples steps in the post-processing stage 907 may also include applying a zero-distance compensation to a computed distance estimate to remove any fixed implementation-specific bias in the estimate. In addition, the post-processing stage 907 may fuse the computed distance estimate and corresponding confidence quality metric derived from one or more algorithms to report a composite result to the application layer. In addition, the post-processing stage 907 may extract data statistics from the set of phase values calculated during the pre-processing stage, computing quality metrics for each phase value, pruning of the phase measurement values based on the quality metrics, and the like.

At step 908, the final distance estimation value is reported. During the reporting stage 908, if an error was detected during the pre-processing stage 906 or post-processing stage 907, the wireless ranging system 903 reports the error, such as by recording the error in an error log for subsequent access by a user or analysis tool. If no error was detected, the measuring device 901 reports the distance to the reflector device 902 and/or provides the distance to software executing at the measuring device 901 or reflector device 902. The executing software can execute one or more specified actions based on the reported distance, such as unlocking a car door, identifying the location of a tracked asset, and the like.

Figure 10:
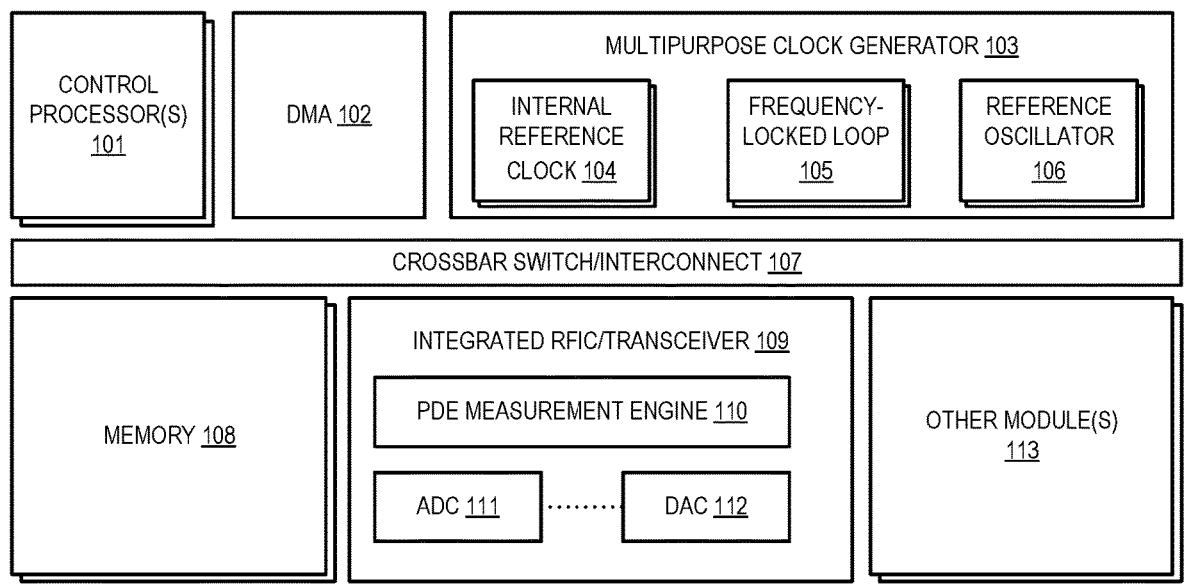
FIG. 10 is a simplified block diagram of a wireless radio microcontroller module which performs a two-way phase-based distance estimation protocol using packet-synchronized data capture in accordance with selected embodiments of the present disclosure.

To provide additional details for an improved understanding of selected embodiments of the present disclosure, reference is now made to FIG. 10 which is a simplified block diagram of a wireless radio microcontroller module 1000 which performs a two-way phase-based distance estimation protocol using packet synchronized data capture. As depicted, the wireless radio microcontroller module 1000 may be implemented in whole or in part as a single integrated circuit that enables Bluetooth Low Energy 5.0 and Generic FSK connectivity for automotive, and industrial embedded systems. As illustrated, the wireless radio microcontroller module 1000 integrates one or more control processor or central processing unit (CPU) subsystems 101, a direct memory access (DMA) unit 102 and a multi-purpose clock generator 103 connected over a crossbar switch or interconnect 107 to one or more on-chip flash or SRAM memory modules 108, an RF integrated circuit (RFIC)/transceiver interface 109, and one or more other modules 113.

In selected embodiments, the CPU subsystem(s) 101 may be embodied as an Arm® Cortex-M0+ CPU or any other suitable type of processing circuit, including but not limited to a microprocessor (MPU), microcontroller (MCU), digital signal processor (DSP), or another type of processor or processor core with multiple levels of cache memory. The control processor(s) 101 are connected over the interconnect 107 to access the memory modules 108 to implement one or more portions of the multi-stage ranging protocol described herein. The memory 108 may include one or more memory modules generally configured to store data on behalf of the processor 101. Accordingly, the memory 108 can be volatile memory such as random-access memory (RAM), non-volatile memory such as flash memory, or a combination thereof. Though not shown, the additional modules 113 may include peripheral devices or special-purpose processors, communication interfaces, timers, encoders/decoders, and one or more external memory interfaces, such as DDR interface or flash interface. In turn, the external memory interfaces may be connected to external memory, such as DDR memory or flash memory. In addition, the interconnect 107 can be any type of bus structure, including but not limited to a non-coherent interconnect, an advanced high-performance bus (AHB), or an advanced peripheral bus (APB).

To support the precise CW signal generation and IQ sample capture processing, the multi-purpose clock generator 103 may include one or more internal reference clocks 104, frequency-locked loop units 105, and reference oscillator(s) 106. Each internal reference clock 104 can be used as a clock source for other on-chip peripherals. In addition, the frequency-locked Loop (FLL) unit 105 may be controlled by internal or external reference to provide an FLL output across a range of frequencies (e.g., 20 MHz to 48 MHz FLL output). In operation, the multi-purpose clock generator 103 is generally configured to provide clock signals to synchronize operations of the transceiver 109 and the PDE engine 110. In at least one embodiment, the multi-purpose clock generator 103 is an adjustable clock source, whereby a control module (not shown) can change the frequency of the clock signal provided by the multi-purpose clock generator 103. The multi-purpose clock generator 103 can thus be adjusted to synchronize with the clock of another radio, such as the transceiver 109 of a peer wireless device (e.g., a reflector device). Further, the multi-purpose clock generator 103 can be adjusted to support frequency hopping during two-way data capture processing.

In further support of precise CW signal generation and IQ sample capture processing, the RFIC interface/transceiver interface 109 may be embodied as a 2.4 GHz radio that supports Bluetooth LE 5.0 and Generic FSK modulations. In addition, the RFIC interface/transceiver interface 109 may include a PDE measurement engine 110 which is implemented in hardware with a vector signal processing accelerator (FECA) which assembles and combines the phase vectors when computing the PDE measurements. In addition, the RFIC interface/transceiver interface 109 is a wireless radio generally configured to provide at least a physical (PHY) and link layers for wireless communication according to one or more wireless protocols such as BLE, IEEE 802.15.4, and GFSK protocols. The RFIC interface/transceiver interface 109 may further be configured to provide control signaling to generate and transmit continuous wave signals at a plurality of carrier frequencies for a defined timer interval duration, to switch from a transmit to receive mode, and to capture IQ samples of a signal received at each specified carrier frequency for the defined timer interval duration. In the depicted example, the control signaling includes generating at least a digital transmission signal (TX_DIG_EN), an access address match signal, and/or a timer sync point signal, each having a relatively fixed relationship with a PDE measurement packet that is transmitted and/or received at the RFIC interface/transceiver interface 109.

By now, it should be appreciated that there has been provided a method, apparatus, and system for estimating distance between first and second wireless radio devices in a wireless network. In the disclosed methodology and system, the first and second wireless radio devices are initially calibrated by exchanging one or more calibration packets using at least a first carrier frequency to adjust one or more transceiver settings for performing phase measurements at the first and second wireless radio devices. Before calibrating the first and second wireless radio devices, the calibration process may be initiated by first transmitting a start indication packet from the first wireless radio device to the second wireless radio device, and then transmitting, from the second wireless radio device to the first wireless radio, an acknowledgement in response to the start indication packet. The disclosed methodology and system also includes transmitting a measurement packet from the first wireless radio device to the second wireless radio device to synchronize the first and second wireless radio devices and to perform a two-way IQ data capture sequence at a plurality of different carrier frequencies during processing of the measurement packet so that the first and second wireless radio devices each measure a plurality of phase values for each of the plurality of different carrier frequencies. In selected embodiments, the measurement packet is transmitted as a phase distance estimation packet having a preamble, an access address, and a data payload so that a first timer at the first wireless radio device and a second timer at the second wireless radio device both expire at a timer sync point that synchronizes the first and second wireless radio devices. In selected embodiments, the first timer is triggered by a digital transmission enable signal at the first wireless radio device and has a first timeout value comprising a fixed capture time, and the second timer is triggered by an access address match signal at the second wireless device and has a second, different timeout value comprising a fixed capture time. In other selected embodiments, the two-way IQ data capture sequence is performed by transmitting, from the first wireless radio device to the second wireless radio device, a first continuous wave signal at a first frequency during transmission of the data payload until the timer sync point; and by capturing, by the second wireless radio device, IQ data from the first continuous wave signal at the first frequency during reception of the data payload until the timer sync point. The two-way IQ data capture sequence may also include transmitting, from the second wireless radio device to the first wireless radio device, a second continuous wave signal at the first frequency so that the first wireless radio device captures IQ data from the second continuous wave signal at the first frequency for a first timer interval during processing of the data payload. The two-way IQ data capture sequence may also include transmitting, from the first wireless radio device to the second wireless radio device, a third continuous wave signal at the second frequency so that the second wireless radio device captures IQ data from the third continuous wave signal at the second frequency for a second timer interval during processing of the data payload by the second wireless radio device; and transmitting, from the second wireless radio device to the first wireless radio device, a fourth continuous wave signal at the second frequency so that the first wireless radio device captures IQ data from the fourth continuous wave signal at the second frequency for a third timer interval during processing of the data payload by the first wireless radio device. In addition, the disclosed methodology and system processes the plurality of phase values at each of the first and second wireless radio devices to generate first and second phase vectors which are combined into a combined phase offset vector at the first wireless radio device. Based on the combined phase offset vector, the disclosed methodology and system determines a first estimated distance between the first and second wireless radio devices. Although the described exemplary embodiments disclosed herein are directed to wireless ranging systems, circuits and methods for calibrating peer wireless devices and then using a defined measurement packet to perform a two-way phase-based distance estimation protocol using packet synchronized data capture, the present invention is not necessarily limited to the example embodiments which illustrate inventive aspects of the present invention that are applicable to a wide variety of circuits, processes and/or devices. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

In another form, there has been provided a device and associated method for estimating distances between wireless radio devices. As disclosed, the device includes a radio that is configured to transmit a measurement packet to a wireless radio device for performing a synchronized two-way IQ data capture sequence with the wireless radio device at a plurality of different carrier frequencies during transmission of the measurement packet. The device also includes a processor that is configured to control the radio to perform the synchronized two-way IQ data capture sequence during transmission of the measurement packet by transmitting a plurality of different carrier frequency signals and by capturing IQ data samples from a corresponding plurality of different carrier frequency signals received from the wireless radio device. The processor is also configured to measure a first plurality of phase values for the IQ samples captured from the corresponding plurality of different carrier frequency signals. In addition, the processor is configured to process the first plurality of phase values with a second plurality of phase values received from the wireless radio device to form a phase offset vector, and to determine a first estimated distance between the device and the wireless radio device based on the phase offset vector. In selected embodiments, the radio is configured to transmit and receive one or more calibration packets using at least a first carrier frequency, and the processor is configured to calibrate the device before transmitting the measurement packet by processing a received calibration packet to adjust one or more transceiver settings at the radio for performing phase measurements at the device. In selected embodiments, the device includes a timer that is configured to be triggered by a digital transmission enable signal for the measurement packet, where the timer has a first timeout value which expires at a timer sync point for synchronizing processing of the plurality of different carrier frequency signals at the device and the wireless radio device. In addition, the processor may be configured to construct the measurement packet as a phase distance estimation packet that includes a preamble, an access address, and a data payload. In such embodiments, the processor may be configured to control the radio to perform the synchronized two-way IQ data capture sequence by transmitting a first continuous wave signal at a first frequency during transmission of the data payload until the timer sync point; and by capturing IQ data from a second continuous wave signal at the first frequency that is received from the wireless radio device during a first specified timer interval after the timer sync point. In addition, the processor may be configured to control the radio to perform the synchronized two-way IQ data capture sequence by transmitting a third continuous wave signal at a second frequency during a second timer interval after the timer sync point; and by capturing IQ data from a fourth continuous wave signal at the second frequency that is received from the wireless radio device during a third specified timer interval after the timer sync point.

In yet another form, there has been provided a device and associated method for estimating distances between wireless radio devices. As disclosed, the device includes a radio configured to receive a measurement packet from a wireless radio device for performing a synchronized two-way IQ data capture sequence with the wireless radio device at a plurality of different carrier frequencies during reception of the measurement packet. The device also includes a processor that is configured to control the radio to perform the synchronized two-way IQ data capture sequence during reception of the measurement packet by transmitting a plurality of different carrier frequency signals and by capturing IQ data samples from a corresponding plurality of different carrier frequency signals received from the wireless radio device. The processor is also configured to measure a first plurality of phase values for the IQ samples captured from the corresponding plurality of different carrier frequency signals to generate a phase vector. In addition, the processor is configured to transmit the phase vector to the wireless radio device which calculates a phase offset vector to determine a first estimated distance between the device and the wireless radio device. In selected embodiments, the radio is configured to transmit and receive one or more calibration packets using at least a first carrier frequency, and the processor is configured to calibrate the device before receiving the measurement packet by processing a received calibration packet to adjust one or more transceiver settings at the radio for performing phase measurements at the device. In embodiments where the measurement packet is received as a phase-based distance estimation (PDE) packet having a preamble, an access address, and a data payload, the device may include a timer configured to be triggered by an access address match signal generated by the PDE packet, where the timer has a first timeout value which expires at a timer sync point for synchronizing processing of the plurality of different carrier frequency signals at the device and the wireless radio device. In such embodiments, the processor may be configured to control the radio to perform the synchronized two-way IQ data capture sequence by capturing IQ data from a first continuous wave signal at a first frequency that is received from the wireless radio device during reception of the data payload until the timer sync point; and by transmitting a second continuous wave signal at the first frequency during a first specified timer interval after the timer sync point. In addition, the processor may be configured to control the radio to perform the synchronized two-way IQ data capture sequence by capturing IQ data from a third continuous wave signal at a second frequency that is received from the wireless radio device during a second specified timer interval after the timer sync point; and by transmitting a fourth continuous wave signal at the second frequency during a third specified timer interval after the timer sync point.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of estimating distance between first and second wireless radio devices in a wireless network comprising:
    transmitting a measurement packet from the first wireless radio device to the second wireless radio device to synchronize the first and second wireless radio devices and to perform a synchronized two-way IQ data capture sequence at a plurality of different carrier frequencies during processing of the measurement packet so that the first and second wireless radio devices each measure a plurality of phase values for each of the plurality of different carrier frequencies;
    processing the plurality of phase values at each of the first and second wireless radio devices to generate first and second phase vectors which are combined into a combined phase offset vector at the first wireless radio device; and
    determining a first estimated distance between the first and second wireless radio devices based on the combined phase offset vector.

2. The method of claim 1, further comprising calibrating the first and second wireless radio devices before transmitting the measurement packet by exchanging one or more calibration packets using at least a first carrier frequency to adjust one or more transceiver settings for performing phase measurements at the first and second wireless radio devices.

3. The method of claim 2, further comprising transmitting a start indication packet from the first wireless radio device to the second wireless radio device before calibrating the first and second wireless radio devices.

4. The method of claim 3, further comprising transmitting, from the second wireless radio device to the first wireless radio, an acknowledgement in response to the start indication packet.

5. The method of claim 1, where transmitting the measurement packet comprises transmitting a phase distance estimation packet comprising a preamble, an access address, and a data payload so that a first timer at the first wireless radio device and a second timer at the second wireless radio device both expire at a timer sync point that synchronizes the first and second wireless radio devices.

6. The method of claim 5, where the first timer is triggered by a digital transmission enable signal at the first wireless radio device and has a first timeout value comprising a fixed capture time, and where the second timer is triggered by an access address match signal at the second wireless device and has a second, different timeout value comprising a fixed capture time.

7. The method of claim 5, where the two-way IQ data capture sequence comprises:
    transmitting, from the first wireless radio device to the second wireless radio device, a first continuous wave signal at a first frequency during transmission of the data payload until the timer sync point; and
    capturing, by the second wireless radio device, IQ data from the first continuous wave signal at the first frequency during reception of the data payload until the timer sync point.

8. The method of claim 7, where the two-way IQ data capture sequence further comprises:
    transmitting, from the second wireless radio device to the first wireless radio device, a second continuous wave signal at the first frequency so that the first wireless radio device captures IQ data from the second continuous wave signal at the first frequency for a first timer interval during processing of the data payload.

9. The method of claim 8, where the two-way IQ data capture sequence further comprises:
transmitting, from the first wireless radio device to the second wireless radio device, a third continuous wave signal at a second frequency so that the second wireless radio device captures IQ data from the third continuous wave signal at the second frequency for a second timer interval during processing of the data payload by the second wireless radio device; and
transmitting, from the second wireless radio device to the first wireless radio device, a fourth continuous wave signal at the second frequency so that the first wireless radio device captures IQ data from the fourth continuous wave signal at the second frequency for a third timer interval during processing of the data payload by the first wireless radio device.

10. A device, comprising:
a radio configured to transmit a measurement packet to a wireless radio device for performing a synchronized two-way IQ data capture sequence with the wireless radio device at a plurality of different carrier frequencies during transmission of the measurement packet; and
a processor configured to:
control the radio to perform the synchronized two-way IQ data capture sequence during transmission of the measurement packet by transmitting a plurality of different carrier frequency signals and by capturing IQ data samples from a corresponding plurality of different carrier frequency signals received from the wireless radio device;
to measure a first plurality of phase values for the IQ samples captured from the corresponding plurality of different carrier frequency signals;
to process the first plurality of phase values with a second plurality of phase values received from the wireless radio device to form a phase offset vector; and
to determine a first estimated distance between the device and the wireless radio device based on the phase offset vector.

11. The device of claim 10, where the radio is configured to transmit and receive one or more calibration packets using at least a first carrier frequency, and where the processor is configured to calibrate the device before transmitting the measurement packet by processing a received calibration packet to adjust one or more transceiver settings at the radio for performing phase measurements at the device.

12. The device of claim 10, further comprising a timer configured to be triggered by a digital transmission enable signal for the measurement packet, where the timer has a first timeout value which expires at a timer sync point for synchronizing processing of the plurality of different carrier frequency signals at the device and the wireless radio device.

13. The device of claim 12, where the processor is configured to construct the measurement packet as a phase distance estimation packet comprising a preamble, an access address, and a data payload.

14. The device of claim 13, where the processor is configured to control the radio to perform the synchronized two-way IQ data capture sequence by:
transmitting a first continuous wave signal at a first frequency during transmission of the data payload until the timer sync point; and
capturing IQ data from a second continuous wave signal at the first frequency that is received from the wireless radio device during a first specified timer interval after the timer sync point.

15. The device of claim 14, where the processor is configured to control the radio to perform the synchronized two-way IQ data capture sequence by:
transmitting a third continuous wave signal at a second frequency during a second timer interval after the timer sync point; and
capturing IQ data from a fourth continuous wave signal at the second frequency that is received from the wireless radio device during a third specified timer interval after the timer sync point.

16. A device, comprising:
a radio configured to receive a measurement packet from a wireless radio device for performing a synchronized two-way IQ data capture sequence with the wireless radio device at a plurality of different carrier frequencies during reception of the measurement packet; and
a processor configured to:
control the radio to perform the synchronized two-way IQ data capture sequence during reception of the measurement packet by transmitting a plurality of different carrier frequency signals and by capturing IQ data samples from a corresponding plurality of different carrier frequency signals received from the wireless radio device;
to measure a first plurality of phase values for the IQ samples captured from the corresponding plurality of different carrier frequency signals to generate a phase vector; and
to transmit the phase vector to the wireless radio device which calculates a phase offset vector to determine a first estimated distance between the device and the wireless radio device.

17. The device of claim 16, where the radio is configured to transmit and receive one or more calibration packets using at least a first carrier frequency, and where the processor is configured to calibrate the device before receiving the measurement packet by processing a received calibration packet to adjust one or more transceiver settings at the radio for performing phase measurements at the device.

18. The device of claim 16,
where the measurement packet comprises a phase distance estimation packet comprising a preamble, an access address, and a data payload; and
where the device further comprises a timer configured to be triggered by an access address match signal generated by the phase distance estimation packet, where the timer has a first timeout value which expires at a timer sync point for synchronizing processing of the plurality of different carrier frequency signals at the device and the wireless radio device.

19. The device of claim 18, where the processor is configured to control the radio to perform the synchronized two-way IQ data capture sequence by:
capturing IQ data from a first continuous wave signal at a first frequency that is received from the wireless radio device during reception of the data payload until the timer sync point; and
transmitting a second continuous wave signal at the first frequency during a first specified timer interval after the timer sync point.

20. The device of claim 19, where the processor is configured to control the radio to perform the synchronized two-way IQ data capture sequence by:

capturing IQ data from a third continuous wave signal at a second frequency that is received from the wireless radio device during a second specified timer interval after the timer sync point; and transmitting a fourth continuous wave signal at the second frequency during a third specified timer interval after the timer sync point.

\* \* \* \* \*